Figure 1:
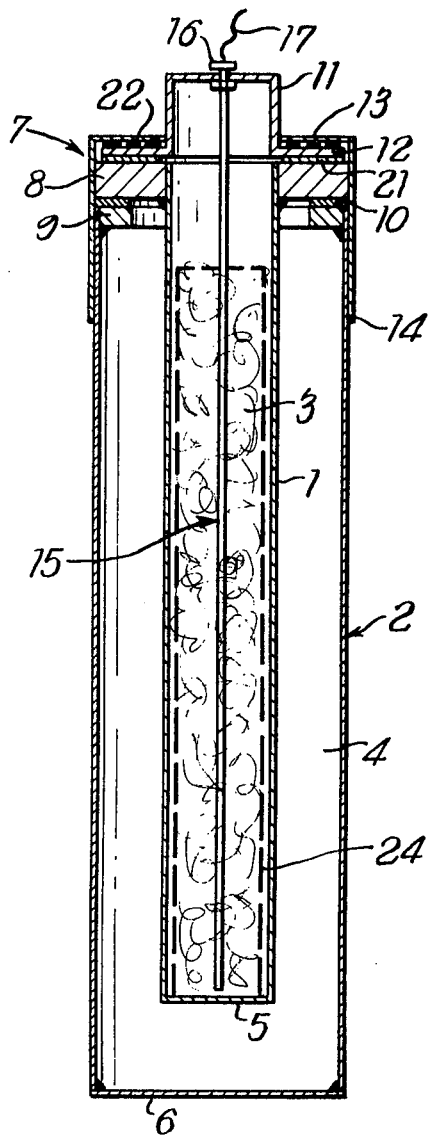

United States Patent [19]
Sudworth et al.

[11] 3,939,007
[45] Feb. 17, 1976

[54] SODIUM SULPHUR CELLS
[75] Inventors: James L. Sudworth, Burton-on-Trent; Alec R. Tilley, Blackbrook, near Belper, both of England
[73] Assignee: British Railways Board, London, England
[22] Filed: Jan. 16, 1974
[21] Appl. No.: 433,976

[30] Foreign Application Priority Data
Jan. 16, 1973 United Kingdom ................ 2267/73

[52] U.S. Cl. .............................. 136/6 FS; 136/83 R
[51] Int. Cl.² .......................................... H01M 10/00
[58] Field of Search ......... 136/6, 20, 133, 168, 169, 136/83

[56] References Cited
UNITED STATES PATENTS

| | | | |
|---|---|---|---|
| 3,214,300 | 10/1965 | Nordvik | 136/133 X |
| 3,449,165 | 6/1969 | Stott | 136/6 FS |
| 3,463,669 | 8/1969 | Jammet | 136/6 B |
| 3,494,801 | 2/1970 | Urry | 136/133 X |
| 3,666,560 | 5/1972 | Cairns et al. | 136/6 F |
| 3,708,343 | 1/1973 | Walsh | 136/133 |
| 3,756,856 | 9/1973 | Tennenhouse | 136/83 R X |
| 3,762,956 | 10/1973 | Gillespie | 136/133 X |
| 3,770,502 | 11/1973 | Nakaboyashi | 136/83 R X |
| 3,833,420 | 9/1974 | Will | 136/6 R |
| 3,833,422 | 9/1974 | Will et al. | 136/6 FX |

Primary Examiner—G. L. Kaplan
Assistant Examiner—C. F. LeFevour
Attorney, Agent, or Firm—Fred Philpitt

[57] ABSTRACT

A sodium sulphur cell comprising inner and outer tubes the inner tube constituting the solid electrolyte for the cell. The interior of the inner tube defines the anode compartment of the cell and the space between the inner and outer tubes defines the cathode compartment of the cell. The inner tube contains metal wool and/or a plate spaced from the inner surface of the inner tube to cause molten sodium to be distributed over the inner surface of the inner tube by capillary action. The inner and outer tubular members are closed at one end by a compression seal assembly. The seal assembly comprises a flange on the inner tubular member engaging the end of the outer tubular member to close the end of the outer tubular member, a closure member engaging the flange to close the inner tubular member, and a clamping member fitting over the closure member and being held in position by the outer tubular member.

5 Claims, 2 Drawing Figures

SODIUM SULPHUR CELLS

This invention relates to sodium-sulphur cells, in which the electrochemical reactants are liquid sodium as negative active material (anode) and liquid sulphur material as positive active material (cathode) and anode and cathode compartments are separated by a solid electrolyte which is a sodium ion conductor, such as beta-alumina.

In particular the invention relates to tube cells of the aforesaid kind having an inner tubular member formed by the electrolyte and a metal outer tubular member.

According to one aspect of this invention the interior of the inner tubular member defines the anode compartment and contains means causing the sodium to be distributed over the inner surface of the inner tubular member and the cathode compartment comprises the space between the inner and outer tubular members.

The means for causing the sodium to be distributed over the inner surface of the inner tubular member may be metal wool which acts to wick the sodium to the inner surface of the inner tubular member over substantially the whole length of the tubular member and so obviates the use of a sodium reservoir. Alternatively or additionally a capillary action may be produced by positioning a member in the tubular member so that it has a surface extending close to the inner surface of the inner tubular member.

According to another aspect of the invention the inner and outer tubular members may be closed at one end by a compression seal assembly comprising a flange on the inner tubular member engaging the end of the outer tubular member to close the end of the outer tubular member and a closure member engaging the flange to close the inner tubular member, the assembly being held in compression by a clamping member which fits over the closure member and is held in position by the outer tubular member. For example the clamping member may be secured to the outer tubular member by spot welding.

Figure 2:
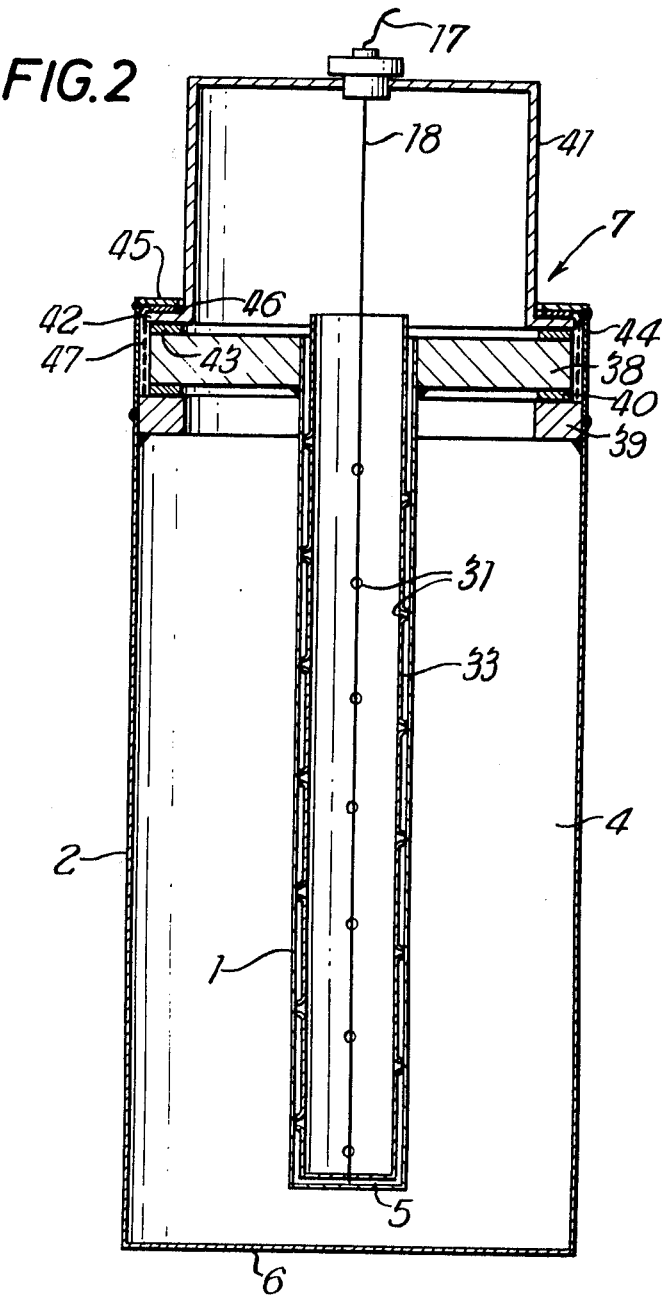

Two constructions of sodium-sulphur cell in accordance with the invention will now be described by way of example with reference to the accompanying drawings, in which FIG. 1 shows a longitudinal section through one cell construction, and FIG. 2 shows a longitudinal section through the other cell construction.

The cell shown in FIG. 1 comprises co-axial inner and outer tubes 1 and 2. The inner tube 1 constitutes the solid electrolyte of the cell and is made of Beta-alumina. The interior of the tube 1 constitutes the anode compartment of the cell and is filled with a metal wool 3 which is inert to the electrochemical reaction of the cell. The outer tube 2 is made of stainless steel. The annular space 4 between the inner and outer tubes 1 and 2 constitutes the cathode compartment of the cell. The inner tube 1 is formed with a closed end 5 and the outer tube 2 has an end plate 6 which is welded into position after formation of the compression seal assembly 7 at the other end of the tubes 1 and 2 and loading up of the cathode compartment with positive active material.

To form the compression seal assembly 7, the inner tube 1 is provided with an alpha-alumina flange 8 which engages an internal flange 9 on the outer tube 2 through an aluminium or "Grafoil" sealing ring 10 to close the end of the outer tube 2. The end of the inner tube 1 is closed by closure member 11 which has an out-turned rim 12 which engages the flange 8 through aluminium sealing gasket 21. To improve the sealing, the rim 12 may have a rib extending around it which engages the gasket 21. The assembly is held in compression by a clamping member 13 which fits over and engages the rim 12 of the closure member 11 through a mica or asbestos insulating washer 22 and is spot welded at 14 to the outer tube 2.

The compression seal is made before the positive and negative active materials are loaded into the cell. As previously stated the positive active material is loaded through the open end of outer tube 2 before fitting end plate 6. To load the negative active material, i.e., the sodium, an aluminium tube 15 passes through the closure member 11 and extends part way down the inner tube 1. Liquid sodium sufficient for the electro-chemical reaction of the cell is passed into the tube 1 through the aluminium tube 15. The outer end of the aluminium tube 15 is closed by an aluminium plug 16. The tube 15 acts as one electrode of the cell and has aluminium lead 17 extending from it. The other electrode of the cell is the outer tube 2.

In one mode of operation of the cell the metal wool 3 maintains electrical continuity between the solid electrolyte and the electrode tube 15. Here equally important however it wicks the liquid sodium to the inner surface of the tube 1, i.e., to the surface of the electrolyte. Hence a sodium reservoir for maintaining the tube 1 filled so that it contacts a substantial part of the inner surface of the tube 1 is not necessary.

In a second mode of operation the cell is used upside down and a reservoir provided by the inner space of closure 11 is used which feeds sodium into the metal wool packing 3. Thus at any one time there is only just sufficient sodium in the tube necessary for the reaction.

In an alternative construction of cell, the metal wool 3 is omitted and the cell is operated in a horizontal position in contrast to the vertical position shown in the drawings. The liquid sodium creeps by capillary action around the inner surface of the tube 1. Hence a sodium reservoir is again obviated.

In an alternative construction shown in FIG. 1 a stainless steel plate is sprung into the tube 1 so that it extends around the tube as shown at 24 in the drawing. The plate 24 has dimples (not shown) which space it from the inner surface of the tube 1 against which it is urged by its inherent resilience. The size of the dimples set the spacing between the tube 1 and plate 24 so that a capillary action causes the sodium to flow over the inside surface of the tube 21.

Referring to FIG. 2, the cell construction is generally similar to that shown in FIG. 1. Thus the cell comprises co-axial inner and outer tubes 1 and 2. The inner tube 1 constitutes the solid electrolyte of the cell and is made of Beta-alumina. The interior of the tube 1 constitutes the anode compartment of the cell. A stainless steel plate 33 is sprung into the tube 1 so that it extends as a cylinder co-axial with the tube 1. In this construction no metal wool packing is used. The resilience of the plate 33 urges it towards the wall of the tube 1 and punched holes 31 or dimples provide projections which space the plate 33 from the wall of the tube 1. This spacing is chosen so as to cause the sodium in the anode compartment to flow over the inside surface of the tube 1 by capillary action.

The outer tube 2 is made of stainless steel. The annular space 4 between the inner and outer tubes 1 and 2 constitutes the cathode compartment of the cell.

The inner tube 1 is formed with a closed end 5 and the outer tube 2 has an end plate 6 which is welded into position after formation of the compression seal assembly 7 at the other end of the tube 1 and loading up of the cathode compartment with positive active material.

To form the compression seal assembly 7, the inner tube 1 is provided with an alpha-alumina collar 38 which abuts through an aluminium or "Grafoil" sealing gasket 40 against a flange 39 welded on to the tube 2, to close the tube 2. The end of the inner tube 1 is closed by a closure member 41 which has an out-turned flange 42 abutting the collar 38 through a second aluminium gasket 43. The assembly is held in compression by a cylindrical clamping member 44 which by its cylindrical skirt is welded to the flange 39 and has an inturned flange 45 abutting the flange 42 of the closure member 41 through an insulating gasket 46. An asbestos sleeve 47 lines the inside of the clamping member 44.

To form the compression seal the clamping member 44 can be initially welded to the flange 39 but formed without its flange 45. After clamping the assembly up in a jig the flange 45 is welded on to maintain the compression. Alternatively the clamping member 44 can be initially formed with its flange 45 and after clamping up can be welded on to the flange 39.

The sodium is loaded into the tube 1 through a hole in closure member 41, which is afterwards closed by an aluminium plug 17. This is done after the compression seal assembly 7 has been formed.

As an alternative to the aluminium or "Grafoil" gasket 43 a friction weld may be formed between the closure member 41 and the collar 38.

If the sealing ring 10 in FIG. 1 and 40 in FIG. 2 is a Grafoil sealing ring, i.e., of graphite composition, then its inherent resilience will compensate for the differential thermal expansions of the components of the sealing assembly 7 as the cell heats up from room temperature to its normal operating temperature of 350°C. If the sealing ring 10 or 40 is aluminium, resilience can be introduced into the seal assembly 7 by using a spring washer beneath the flange 13 (FIG. 1) or 45 (FIG. 2) of the clamping member. Alternatively the flange 12 (FIG. 1) or 42 (FIG. 2) of the closure member can be of a high thermal expansion in order to keep the seal assembly 7 tight. As a further alternative the flange 13 (FIG. 1) or 45 (FIG. 2) can be formed as a series of spring segments formed for example by a series of radial saw cuts in the flange.

We claim:

1. A sodium-sulphur cell having
   a. a metal outer tubular member open at one end and closed at its other end,
   b. an inner tubular member extending substantially coaxially of the outer tubular member and open at its end adjacent the open end of the outer tubular member and closed at its other end, the inner tubular member constituting a solid electrolyte for the cell and dividing the cell into anode and cathode compartments, one said compartment being formed by the interior of the inner tubular member and the other said compartment being formed by the annular space between the inner and outer tubular members,
   c. an inturned radial flange on the outer tubular member,
   d. an out-turned radial flange on the inner tubular member,
   e. first compressible sealing means through which said out-turned radial flange abuts said inturned radial flange to close the annular space between said inner and outer tubular members,
   f. a closure member for closing said open end of the inner tubular member,
   g. second compressible sealing means through which said closure means abuts said out-turned radial flange, and
   h. a clamping member having an inturned radial flange which abuts said closure member and is held in position by said outer tubular member so that it applies a compression force axially of said tubular members to both said first and second sealing means.

2. A sodium-sulphur cell according to claim 1 wherein the clamping member is welded to the outer tubular member.

3. A sodium-sulphur cell according to claim 1 wherein the clamping member has a cylindrical portion by which it is secured to the outer tubular member.

4. A sodium-sulphur cell according to claim 3 wherein the cylindrical portion extends over the outside of the outer tubular member.

5. A sodium-sulphur cell according to claim 3 wherein the cylindrical portion is welded around one of its ends to the outer tubular member.

* * * * *